United States Patent
Frantz et al.

[19]

[11] Patent Number: 5,846,377
[45] Date of Patent: Dec. 8, 1998

[54] METHOD FOR PROCESSING WORKPIECES BY ULTRASONIC ENERGY

[75] Inventors: Jeffrey L. Frantz, Southbury; David A. Grewell, Waterbury, both of Conn.

[73] Assignee: Branson Ultrasonics Corporation, Danbury, Conn.

[21] Appl. No.: 892,153

[22] Filed: Jul. 14, 1997

Related U.S. Application Data

[63] Continuation of Ser. No. 506,104, Jul. 24, 1995, Pat. No. 5,658,408, which is a continuation-in-part of Ser. No. 221,047, Mar. 31, 1994, Pat. No. 5,435,863, which is a continuation-in-part of Ser. No. 871,692, Apr. 21, 1992, abandoned.

[51] Int. Cl.$^6$ ..................................................... B32B 31/00
[52] U.S. Cl. ......................... 156/359; 156/64; 156/73.1; 156/580.1
[58] Field of Search ........................... 156/64, 73.1, 73.3, 156/73.4, 358, 359, 580.1; 264/442, 443, 445; 425/174.2

[56] References Cited

U.S. PATENT DOCUMENTS

| | | | |
|---|---|---|---|
| 3,432,691 | 3/1969 | Shoh | 310/316 |
| 3,469,211 | 9/1969 | Shoh et al. | 311/116 R |
| 3,733,238 | 5/1973 | Long et al. | 156/580.1 |
| 4,618,516 | 10/1986 | Sager | 156/73.1 X |
| 4,631,685 | 12/1986 | Peter | 156/73.1 X |
| 4,690,722 | 9/1987 | Flood | 156/73.1 X |
| 4,859,378 | 8/1989 | Wolcott | 156/73.1 X |
| 4,973,876 | 11/1990 | Roberts | 310/316 |
| 5,435,863 | 7/1995 | Frantz | 156/64 |
| 5,487,802 | 1/1996 | Mizuta et al. | 156/73.1 |
| 5,658,408 | 8/1997 | Frantz et al. | 156/64 |
| 5,772,814 | 6/1998 | Grewell | 156/64 |

FOREIGN PATENT DOCUMENTS

| | | |
|---|---|---|
| 1030367 | 2/1986 | Japan . |
| 2168206 | 7/1987 | Japan . |
| 903161 | 2/1982 | Russian Federation . |

OTHER PUBLICATIONS

Paper presented to ANTEC–94 entitled "Amplitude Control in Ultrasonic Welding of Thermoplastics" by David A. Grewell and Jeffrey L. Frantz, presented May 2, 1994.

*Primary Examiner*—James Sells
*Attorney, Agent, or Firm*—Polster, Lieder, Woodruff & Lucchesi

[57] ABSTRACT

A method of welding two thermoplastic workpieces (W) together along a predetermined weld line during a weld cycle utilizing a high frequency vibration sonic or ultrasonic welding apparatus. This welding apparatus includes an electroacoustic transducer (18) which transmits such vibrations to a horn (19) which is dimensioned to be resonant with the horn being brought into forced engagement with at least one of the workpieces to be welded. The method comprising the steps of bringing the workpieces into bearing relation against one another along the weld line. Then the electroacoustic transducer is energized so as to resonate the horn with a desired motional amplitude. Forceful contact is established between the horn and one of the workpieces. Then, the forceful contact between the horn and the one workpiece is maintained throughout the weld cycle. The motional amplitude of the horn is varied in accordance with a desired motional amplitude profile.

10 Claims, 9 Drawing Sheets

ENERGY DIRECTORS

METHOD FOR PROCESSING WORKPIECES BY ULTRASONIC ENERGY

CROSS REFERENCE TO A RELATED APPLICATION

This is a continuation of application Ser. No. 08/506,104, filed on Jul. 24, 1995, now U.S. Pat. No. 5,658,408 which is a continuation-in-part of U.S. patent application Ser. No. 08/221,047 filed Mar. 31, 1994, now U.S. Pat. No. 5,435,863, which is a continuation-in-part of U.S. patent application No. 07/871,692 filed Apr. 21, 1992, now abandoned.

BRIEF DESCRIPTION OF THE INVENTION

This invention concerns a method for processing workpieces by ultrasonic energy and, more specifically refers to a method for processing thermoplastic workpieces using vibratory energy in the ultrasonic frequency range for bonding, sealing or welding thermoplastic film and fabric materials as well as substantially rigid workpieces. Quite specifically, this invention concerns a method wherein the motional amplitude of the ultrasonically resonating horn in contact with the workpiece is varied during the processing time interval, thereby changing the power transmitted from the horn to the workpiece during such interval.

Welding thermoplastic workpieces and plunge sealing film and fabric materials by sonic or ultrasonic energy is well known. Generally, the workpiece is supported on an anvil. An electroacoustic transducer is coupled to a horn, dimensioned to be resonant, preferably as a one-half wavelength resonator or multiples thereof for high frequency vibrations of predetermined frequency traveling longitudinally therethrough, is brought into forced engagement with the workpiece for a time interval (referred to as a weld or work cycle) and, responsive to the horn being rendered resonant, sonic energy is transmitted to the workpiece for causing a softening and flowing of thermoplastic material of the workpiece. Upon the cessation of the flow of sonic energy, the softened and flowed material rigidities, thereby establishing a bond or a weld. As used in this disclosure, the terms "sonic" and "ultrasonic" are used interchangeably and these terms refer to vibrations having a frequency ranging generally between about 10 KHz to about 50 KHz, and more preferably between about 16 KHz and about 40 KHz, and even more preferably between about 20–40 KHz.

Generally, it is recognized that the ultrasonic (or sonic) power transmitted to the workpieces is dependent on three factors, namely, the frequency of the electroacoustic transducer, the force or clamping pressures applied to the workpieces by the horn, and the motional amplitude of the horn as it transmits the energy to the workpieces. It will be appreciated that, in general, in a sonic welding machine, the frequency of the electroacoustic transducer is relatively constant. In the past, it has been the common practice to retain the motional amplitude of the horn, i.e. the peak-to-peak mechanical excursion of the frontal horn surface in contact with the workpiece (as measured in microns and herein designated as "$\mu m_{pp}$"), constant during the entire time interval during which the horn is rendered resonant and transfers power to the workpiece. The present invention discloses an arrangement and method in which the motional amplitude of the horn, and thereby the ultrasonic power transmitted, is varied during the processing time interval in response to a control signal which may be responsive, for instance, to a change in power transmitted from the horn to the workpiece, a process related change of the workpiece dimension, a process related timing signal, or some other process related parameter.

The invention, which will be described in detail hereafter, has been made possible by the development of an improved electronic power supply disclosed in U.S. Pat. No. 4,973,876 issued to A. J. Roberts, dated Nov. 27, 1990, entitled "Ultrasonic Power Supply", which patent is specifically incorporated herein by reference. This power supply includes control means for adjusting the motional amplitude of the horn independent of line voltage or load fluctuations.

SUMMARY OF THE INVENTION

In the present invention, it has been discovered that a change (i.e., lowering or raising) of the motional amplitude of the horn effected either 1) in response to the power transmitted to the workpiece attaining a predetermined value with this lower power level being continued for the remainder of the preset weld cycle time interval, or 2) in response to a predetermined portion of the weld cyclers having elapsed, or 3) in response to some parameter of the weld or work cycle, or 4) in response to some predetermined motional amplitude profile improves the resultant weld (or certain characteristics of the weld) and diminishes tool wear, particularly in a condition in which the horn frontal surface strikes a metal anvil, as for instance, in plunge sealing and cutting thermoplastic film and fabric materials.

One of the objects of this invention is, therefore, the provision of an improved method for processing thermoplastic workpieces by the application of ultrasonic energy in which the motional amplitude is varied over the course of the weld cycle in accordance with a predetermined motional amplitude profile or in response to a parameter of the welding operation.

Among the other objects of this invention may be noted the provision of a method of welding workpieces to one another using ultrasonic energy in which the motional amplitude of the horn is ramped up or down so as to result in an increase in weld strength of the welds formed by such a method.

Another object of this invention is the provision of an apparatus and method of operating it for varying during the processing time interval the motional amplitude of the ultrasonically vibrating horn in forced engagement with a workpiece.

A further object of this invention is the provision of a method for processing workpieces by ultrasonic energy and varying the motional amplitude of the horn and thus the power transmitted to the workpiece in response to a process related control signal.

Still a further object of this invention is the provision of a method for welding thermoplastic workpieces by ultrasonic energy in which the motional amplitude of the horn is gradually increased for an initial portion of the weld cycle so as to preheat (or to partially melt) at least a portion of the workpieces in the region of the weld line to be formed, and then, after this initial portion of the weld cycle, to increase the motional amplitude so as to complete the weld.

Another object of this invention is the provision of such a method for welding thermoplastic workpieces by ultrasonic energy which minimizes the amount of weld particles and the weld flash formed during the welding cycle where these weld particles and/or weld flash may contaminate the surfaces or the workpieces or a product to be enclosed in a container formed by the workpieces.

Another object of this invention is the provision of such a method for welding thermoplastic workpieces by ultrasonic energy in which the weld is more resistant to solvents.

Another object of this invention is the provision of such a method for welding thermoplastic workpieces by ultrasonic energy in which the polymer molecules in the weld are randomly aligned so as to increase the strength of the weld.

Another object of this invention is the provision of such a method for welding thermoplastic workpieces by ultrasonic energy in which the formation of dead spots within the weld is minimized which in turn enhances the strength of the weld.

Still other and further objects of this invention will become more clearly apparent from the following description when taken in conjunction with the accompanying drawings.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
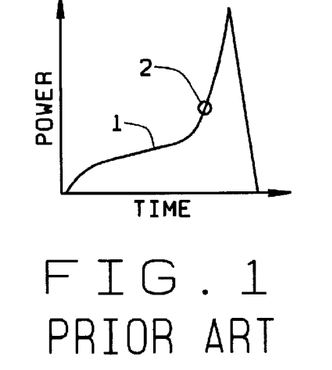
FIG. 1 is a graph depicting power vs. time in a typical ultrasonic cut and seal operation.

Referring now to the drawings and FIG. 1 in particular, there is shown a graph of power applied from the horn of an ultrasonic welder to the workpiece in a typical plunge type ultrasonic seal and cut operation, wherein two thermoplastic film or fabric materials, superposed upon one another, are disposed on a metal anvil, and a horn is brought into forced contact with the exposed workpiece surface to simultaneously cut through the two layers, separating them from the surrounding stock material, and welding the two layers of material along the cut edge. A typical example is the manufacture of a circular filter pad. Upon the horn contacting the workpiece with a predetermined force, the horn is rendered resonant and ultrasonic energy is coupled to the workpiece, thus starting a time interval (also known as the weld cycle time interval or the cut and seal cycle time), as shown by curve 1. After some passage of time during the time interval, the horn cuts through the workpiece and the horn establishes direct metal-to-metal contact with the metal anvil. Prior to this point during the weld cycle time interval, as indicated at point 2 in FIG. 1, the power flow rises rapidly as a result of the lower acoustic impedance of the melt. The power continues to rise sharply until the end of the weld cycle time interval, generally a preset (or predetermined) time interval. However, the end of the weld cycle may be determined in response to a weld related parameter, as hereinafter described.

In production, the repetitive high frequency impact of the horn in direct metal-to-metal contact with the anvil, which occurs with a force of several thousand gravities, and the somewhat scrubbing motion of the vibrating horn causes a relatively rapid wear of the impacting anvil and horn surfaces. This oftentimes necessitates the early refinishing of the surfaces or replacement of the horn and anvil. In typical instances, the front surface of the horn becomes grooved and the knife-shaped cutting surface of the anvil becomes dull thus adversely affecting the ability of the ultrasonic welder to carry out its intended welding functions.

Figure 2:
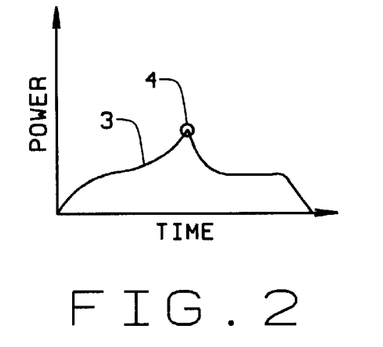
FIG. 2 is a graph similar to FIG. 1, but reducing the motional amplitude of the horn when the power attains a predetermined level.

FIG. 2 shows the improved arrangement of the present invention. In response to the rise of the power transfer, as shown by the portion of the power vs. time curve indicated by numeral 3 starting at the origin and continuing to point 4 which corresponds to the formation of the melt, a control signal is produced which, in turn, causes a reduction of the motional amplitude for the remainder of the cut and seal cycle. Thus, the power provided for the remainder of the cut and seal cycle is limited. The reduction of power has effected a dramatic reduction of the mechanical wear apparent at the frontal surface of the horn and at the raised anvil cutting surface.

Figure 3:
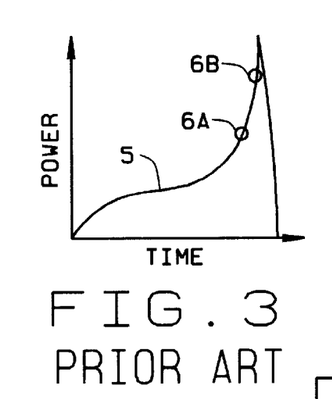
FIG. 3 is a graph similar to FIG. 1 when producing a filter comprising two superposed non-woven materials.

FIG. 3 depicts a graph of power vs. time when welding two superposed layers of non-woven thermoplastic material for producing a filter. The portion 5 of the curve from the origin to the point 6A is similar to the portion of the curve in FIG. 1 from the origin to point 2. As the filter material melts, there is evident a short period of time during the weld cycle (this short period of time being referred to as a window) between the time a good bond condition may be effected, as indicated at 6A, and the time an overwelded condition is effected, as indicated at 6B. The power curve 5 of prior art welding apparatus and methods provides a very narrow time window (between points 6A and 6B) for achieving a good product. As will be hereinafter described, the method of the present invention greatly lengthens the window during the predetermined weld cycle during which a good bond condition may be achieved. In addition, the method of this invention permits a wider range of weld parameters and yet will result in good bond condition welds which are much more repeatable in actual production conditions.

Figure 4:
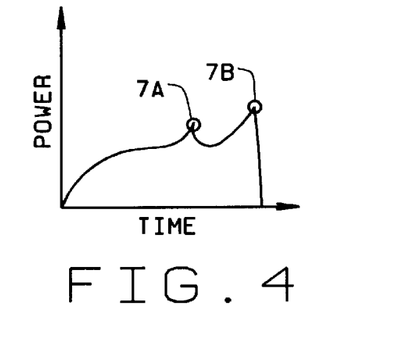
FIG. 4 is a graph of power vs. time when the power level is reduced during the time interval of producing a filter.

FIG. 4 shows the condition wherein by reducing the motional amplitude of the horn, as indicated at 7A, at the time the power would normally increase sharply due to the material having reached a melted condition, the time window, as indicated by the change in time between points 7A and 7B, available for producing a good product is widened considerably. It will be apparent that once the material has reached its melted state, there is no need for increasing power. A relatively low power level will suffice to complete the weld cycle. Additionally, providing a wider time window in which good welds may be made allows wider tolerances for many of the weld parameters (including weld power, material thickness and other variations, horn characteristics and other variables).

Figures 10, 11, 12:
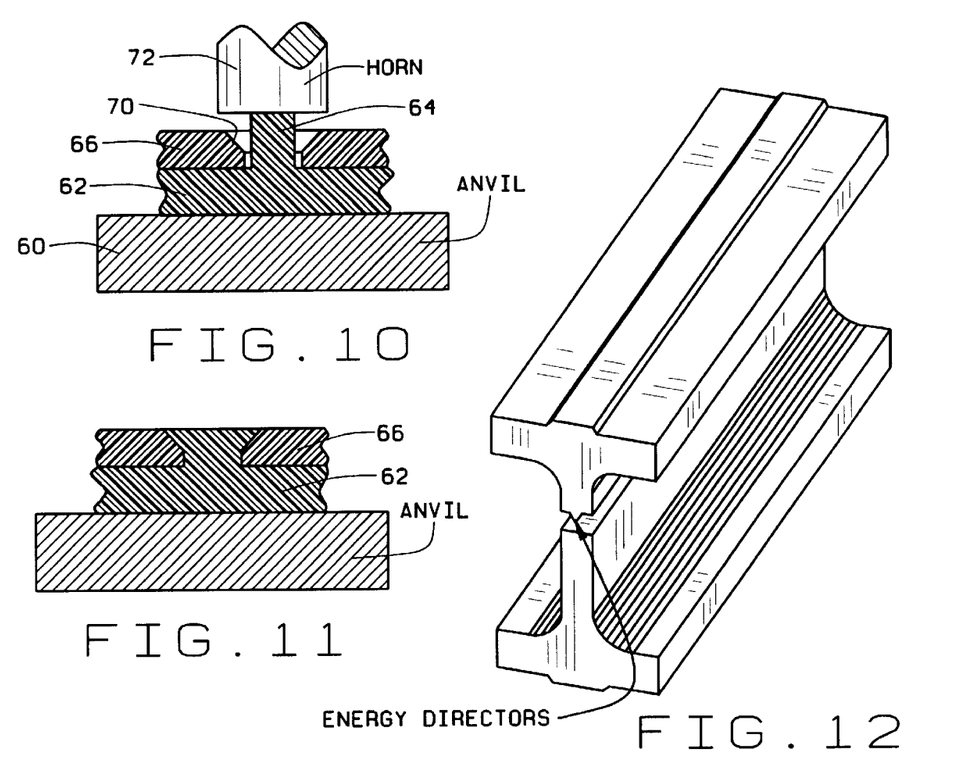
FIG. 10 is a somewhat diagrammatic view of two workpieces undergoing a staking or riveting operation in accordance with one embodiment of the method of the present invention.
FIG. 11 is a view corresponding to FIG. 10 after completion of the staking or riveting operation.
FIG. 12 is a perspective view of a proposed AWS standard weld test specimen utilized in the test results hereinafter described.

The novel arrangement disclosed herein is applicable also to the process of welding substantially rigid thermoplastic workpieces, for instance, when joining two parts, one being provided with a projection, also known as energy director, which responsive to the dissipation of ultrasonic energy melts and collapses, the molten material filling a recess which may be optionally provided in the other part, as shown for instance in U.S. Pat. No. 4,618,516 dated Nov. 21, 1986, issued to T. B. Sager, entitled "Ultrasonic Welding of Thermoplastic Workpieces". Such an energy director is shown in FIG. 12. It will also be understood that other joint constructions (as hereinafter described) may be used for carrying out the method of the present invention. In accordance with the present invention, the ultrasonic horn transmits ultrasonic energy to the stacked parts during a first portion of the weld or work cycle at a first motional amplitude level so as to heat the interface between the two parts and so as to preheat and/or to soften or melt the energy director at a first heating rate. After initial softening and flowing of thermoplastic material has occurred, as may be determined by sensing when the energy director has partially melted and thus at least partially collapsed, or which may be determined by the passage of a preset portion of the time interval (weld cycle), the power (i.e., the motional amplitude of the horn) necessary to complete the weld cycle may be changed to a second motional amplitude level for the remainder of the weld cycle so as to continue heating the material at a second (typically at a lower) heating rate. The reduction in power with the consequent lower heating rate has been observed to reduce the presence of visible flash and the presence of voids in the weld. The voids result from cavitation in the melted material and their existence weakens the weld. There are other factors which may weaken a weld joint and these other factors include strong molecular alignment traverse to the bondline and large residual stresses, both of which can be reduced by varying motional amplitude. The result is a process which makes welds more easily and repeatable, which gives a wider degree of process tolerances, and which produces stronger welds than the prior art ultrasonic welding processes.

The control signal for effecting the reduction of the motional amplitude can be responsive to the value of the power provided to the workpiece as illustrated heretofore, or can be responsive to other parameters of the process. For example, a control signal can be produced in response to a predetermined amount of time elapsed in the weld cycle. Other control signals can be produced in response to a changing mechanical dimension of the workpiece assembly as sensed, for instance, by mechanical sensing means, optical sensing means, or an eddy current sensing device, see U.S. Pat. No. 4,631,685 dated Dec. 23, 1986 issued to D. A Peter, entitled "Method and Apparatus for Ultrasonic Plastic Forming and Joining". Therefore, in a typical application, the reduction of power transmitted may be effected when, for example, fifty percent (50%) of the collapse of the energy director is sensed or has been established experimentally. In the latter case, the control signal can be responsive to time elapsed in the weld cycle.

As will be apparent to those skilled in the art, the reduction of motional amplitude of the horn does not need to occur abruptly or as a single step. A varying or dynamic control signal may be provided, produced for instance by a function generator which is triggered upon the start of the weld cycle. In this manner, a continuously varying power output can be achieved. The latter arrangement is particularly useful when welding difficult-to-weld workpieces as caused by the composition of the thermoplastic material.

Figure 5:
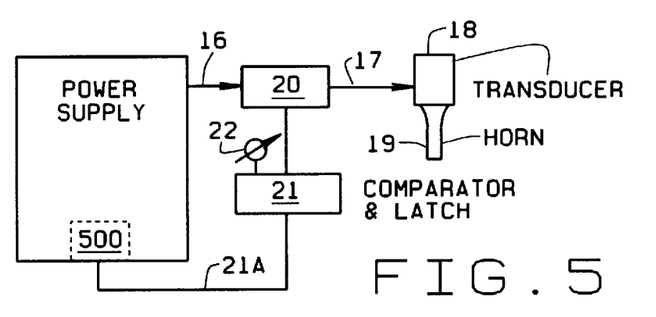
FIG. 5 is a schematic illustration of a typical embodiment of an apparatus for carrying out the method of the present invention.

FIGS. 5–8 show schematically an apparatus for carrying out the methods of the present invention, as herein described. As stated hereinabove) the power supply shown in U.S. Pat. No. 4,973,876 (which is incorporated by references herein) includes a voltage control circuit, see FIGS. 1 and 8 of the last-mentioned U.S. patent, is well suited for varying the power (i.e., the motional amplitude) applied to the workpiece. With reference to FIG. 5, the conductor 16 from the power supply 8 leads to a power meter 20 for sensing the electrical power supplied via conductor 17 to the electroacoustic transducer 18, which is fitted with a horn 19. A comparator and latch circuit 21 receives a signal commensurate with the power to the transducer 18. An adjustment control 22 provides a variable reference signal adjustment to the comparator and when the power commensurate signal exceeds the reference signal, the comparator provides an output signal which is locked on by the latch circuit and fed as a control signal via conductor 21A to the voltage control circuit 500 forming a part of the power supply. The voltage control circuit, in turn, causes a change in the motional amplitude of the horn as described in the patent supra.

Figure 6:
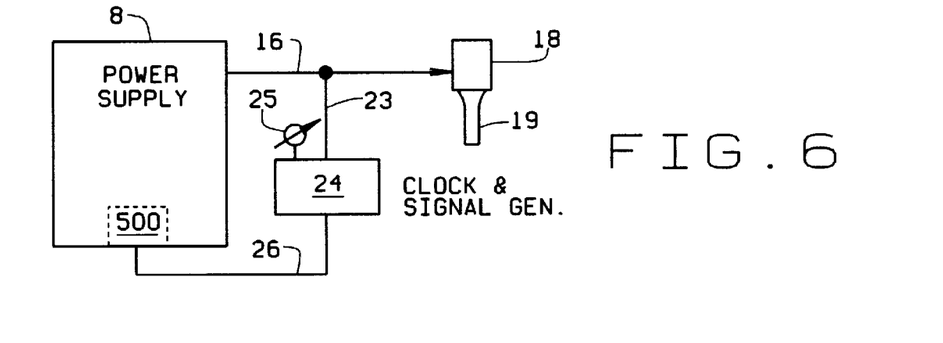
FIG. 6 is a schematic illustration showing an alternative embodiment of an apparatus for the invention.

FIG. 6 shows schematically the use of a time responsive signal. Conductor 23 causes a set/reset signal to be applied to the clock and signal generator 24 actuated by a set signal responsive to the start of power flow to the transducer 18. When the clock circuit receives the signal via conductor 23 and the clock reaches a preset point in time, settable by adjustment 25, the signal generator via conductor 26 provides a control signal to the voltage control circuit 500 for changing the power level to the transducer. When the power transfer stops at the end of the time interval during which power flows, the circuit 24 is reset.

Figure 7:
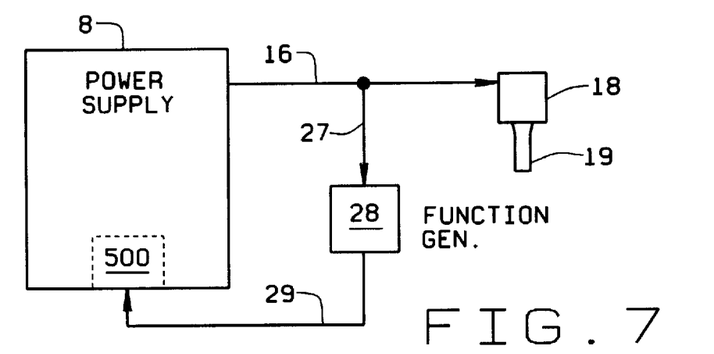
FIG. 7 is a schematic illustration of a further alternative embodiment of an apparatus for the invention.

FIG. 7 is a similar arrangement as shown in the preceding figures, except a function generator 28, started upon the receipt of a signal via conductor 27, sends a varying control signal via conductor 29 to the voltage control circuit 500.

Figure 8:
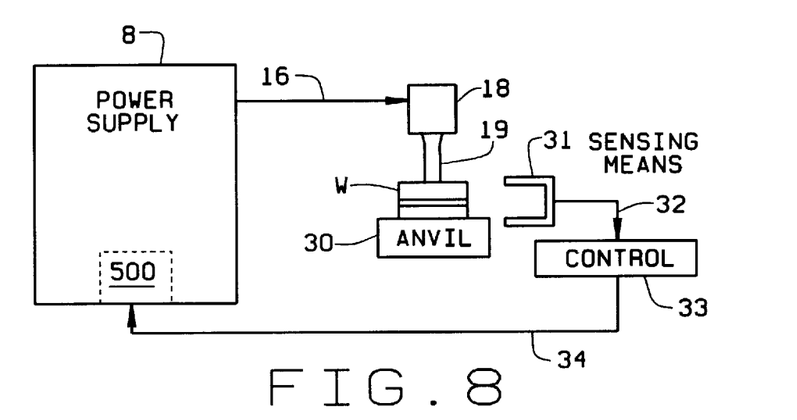
FIG. 8 is a schematic illustration of still another embodiment of an apparatus suitable for the invention.

FIG. 8 depicts the horn 19 in forced contact with a workpiece W to be welded and supported on an anvil 30. A suitable sensing means 31, senses the change of dimension of the workpiece during welding together the two workpiece halves. As stated above, suitable sensing means comprise optical, electrical, acoustic or mechanical sensing means well known in the art. When the workpiece dimension changes to a predetermined value, as noted by the control circuit 33 receiving a dimension responsive signal via conductor 32, a control signal is provided via conductor 34 to the voltage control circuit 500 of the power supply 8. Again, the control signal serves to cause a change in the motional amplitude of the horn and thereby a change in the power transmitted from the power supply to the electroacoustic transducer, horn and workpiece.

Figure 9:
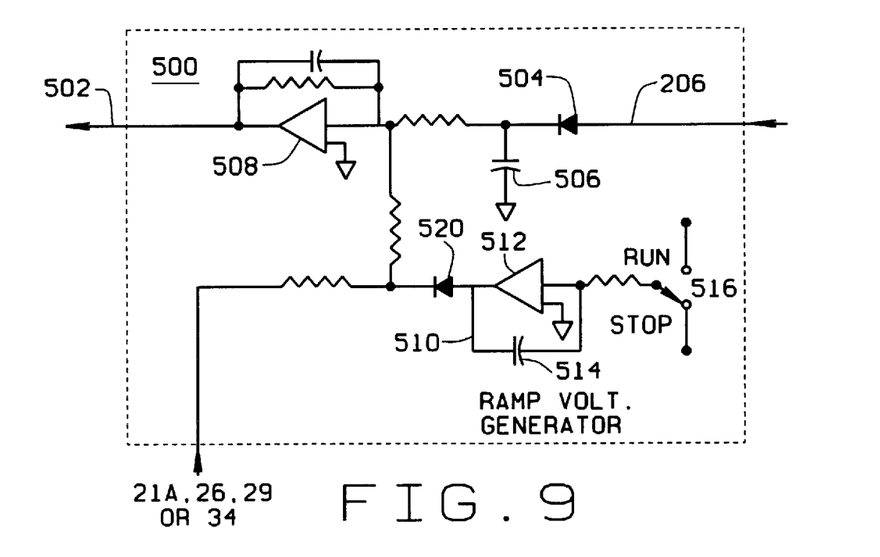
FIG. 9 is a schematic electrical circuit diagram.

FIG. 9 shows the voltage control circuit shown in the patent to Roberts, supra. The amplitude control adjustment via variable resistor 518 shown in the patent has been eliminated and replaced by the control signal carrying conductor 21A, 26, 29 or 34. All other circuit features are as described in the Roberts patent.

Another application in which a function generator 28, as shown in FIG. 7, will be useful is the rotary drum sealing arrangement, see for example U.S. Pat. No. 3,733,238 issued to D. D. Long et al, dated May 15, 1973 entitled "Apparatus for Vibration Welding of Sheet Material", or U.S. Pat. No. 4,690,722 issued to G. N. Flood dated Sep. 1, 1997 entitled "Ultrasonic Apparatus for Joining and Severing Sheet Material". In such an application the function generator preferably provides a changing signal to cause a modulated power output. This can be achieved by a triangular, trapezoidal or sinusoidal control signal, or some other periodically changing signal.

The above-described process is applicable also for staking and riveting two parts to one another. As seen in FIG. 10, numeral 60 designates an anvil supporting a first thermoplastic part or workpiece 62 which is provided with an upstanding stud 64, preferably of circular cross-section. A second part or workpiece 66, which may be of thermoplastic or non-thermoplastic material, is superposed on the workpiece 62 and has an aperture 68 through which the stud 64 extends. The workpiece 66 is provided also with a chamfer 70 for forming a recess adapted to receive and be filled with melted and displaced thermoplastic material from the stud 64 during the deformation of the stud responsive to the dissipation of ultrasonic energy which is transferred from the horn 72 to the extended upper surface of the stud by forced contact between the horn and the stud. As the horn transfers ultrasonic energy to the stud, the stud 64 melts at its upper portion causing the melted and displaced material to fill the gap between the stud 64 and the surrounding workpiece 66, thus creating a staked or riveted assembly as seen in FIG. 11. Causing the motional amplitude of the horn to undergo a change from an initial high amplitude for initiating the softening and flowing of thermoplastic material to a lower motional amplitude for completing the displacement of melted material during the latter part of the process interval produces a stronger assembly and a more pleasing appearance of the final product because of the reduced splatter of thermoplastic material. This is true, in particular, when the thermoplastic material comprises a crystalline structure or is a material with a high filler content.

It has been known that in the formation of a weld joint with an ultrasonic welder that particulate matter from the thermoplastic parts is generated and expelled from the weld site during the weld cycle. In forming a container or other workpiece using ultrasonic welding, particularly a container or other workpiece for medical products, these particles can splatter from the weld into the container such that upon filling the container with a product, contamination of the product can result. We have found that the majority of these particles are generated during the beginning of the weld cycle as a result of the shattering or breakage of the energy director at the onset of the weld cycle.

In accordance with the improved method of this invention of forming a weld joint between two thermoplastic parts using ultrasonic energy, it has been found that if an energy director, such as the above-described energy director shown in FIG. 12, is pre-heated during the weld cycle, as by gradually heating the energy projector during the initial phase of the weld cycle, the tendency of the energy director to shatter or break and to thus form the abovedescribed particles during the initial portion of the weld cycle is minimized. This results in a cleaner weld joint. Further, it has been found that this more gradual heating of the energy director (i.e., motional amplitude profiling) during the weld cycle also results in the formation of less flash which in turn eliminates crevices along the weld in which contaminants may collect. Again, this also results in an cleaner weld.

More specifically, in accordance with another method of the present invention, upon initiation of the weld cycle, the motional amplitude of the ultrasonic horn is gradually increased (i.e., ramped up) from a relatively low power level or motional amplitude to a higher motional amplitude (e.g., from about 5% to about 80% (and more preferably from about 10% to about 40%) of its full motional amplitude) over the initial portion (e.g., about the first 250 milliseconds) of the weld cycle such that relatively low ultrasonic energy is applied to the part and particularly to the energy director. Such a motional amplitude weld cycle profile is illustrated in FIG. 18I. It will be understood that the above examples of the range of motional amplitudes for the initial preheating period and the initial time for the preheating period may, in accordance with this invention, vary widely, depending the size of the workpieces, the resin from which the workpieces are formed, the length of the weld line, the power of the ultrasonic welder, and many other factors.

As previously noted, it has been found that this more gradual application of power to the energy director over this initial period of time allows the energy director to soften and/or to at least partially melt rather than to shatter thus significantly reducing the formation of particles during the weld cycle. In fact, testing (as described in detail below) has shown that by slowly heating the energy director, up to about an 81% reduction of particulates may be achieved which in turn results in the formation of a weld with substantially fewer particles which may contaminate the weld or a product to be contained within a container formed by the workpieces.

In some applications when the parts to be welded are of crystalline structure (e.g., such thermoplastic resins as nylon, nylon 66, acetal, polypropylene, polyethylene, and thermoplastic polyester) with energy directors, the weld has areas where melting does not occur and where the energy director is mechanically collapsed instead of melted. The cause of this phenomena is not yet fully understood, but is believed to be due to non-uniform heating due to residual stresses and/or modes of vibration of the parts. The non-uniform heating is then compounded by a relatively sharp transition of melting. Once portions of the energy director melt and flow, the remaining portions must support the clamp loads from the welding horn and the welding machine and these portions collapse and deform thus forming so-called "dead spots" within the weld which make it nearly impossible to promote uniform melting and fusion. It has been found by using relatively high amplitude, for example 100 $\mu m_{pp}$, melting occurs so rapidly that the energy director does not collapse and the "dead-spots" are not seen. However, it has been found that it is not always possible to employ such high amplitude during the weld cycle because of a variety of reasons. In accordance with the method of amplitude profiling of the present invention, we have found that by preheating the energy director with a more moderate amplitude (e.g., 58 $\mu m_{pp}$), these dead spots can be reduced. It is believed that by preheating the energy director, more uniform heating of the material in the weld zone is promoted.

While the above-described method of welding (or otherwise forming) thermoplastic workpieces has been described in regard to welded joints in which an energy director is employed, it will be understood that the method of this invention also has utility in welding other types of joints commonly employed in the use of ultrasonic thermoplastic welders. For example, the welding methods of the present invention may be used with so-called "shear joints" where the weld is accomplished by first melting the small, initial contact area and then continuing to melt with a controlled interference along the vertical walls of the workpieces as the workpieces telescope together. It will be further understood that the energy directors heretofore described may include many variations other than the version described in the above-noted co-assigned U.S. Pat. No. 4,618,516 in which the energy director is described. These other joints include a tongue and groove joint where the energy director is carried on the end of the tongue, or a so-called textured surface joint in which the mating surface on at least one of the workpieces is textured so as to improve frictional characteristics and to control melt by providing a textured surface having fine ridges and grooves about 0.003–0.006 in. deep formed on one of the surfaces. Further, the method of this invention may be employed with a so-called "criss cross" joint where a surface in the area of the weld joint on at least one of the workpieces is provided with a multiplicity of closely spaced energy directors on one of the workpieces which intersect one or more energy directors on the weld surface of the other workpiece.

Figure 18A:
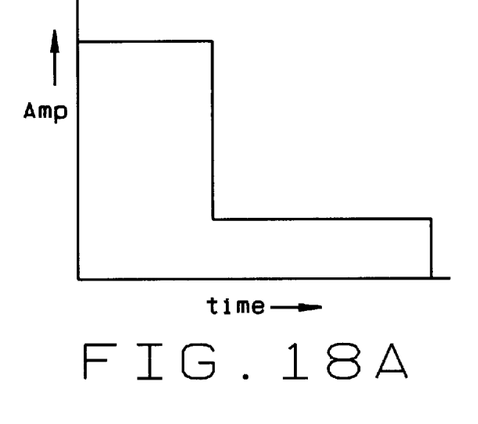
FIGS. 18A–18I depict various weld cycle motional amplitude profiles for various weld cycles which, in accordance with the method of this invention, yield various desired results.
Figure 18B:
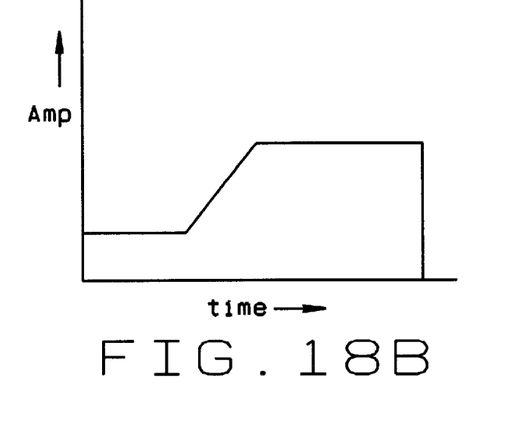
Figure 18C:
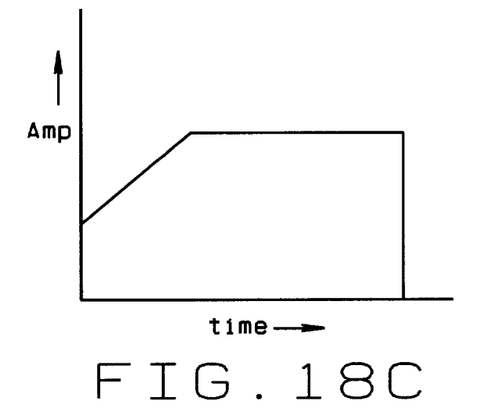
Figure 18D:
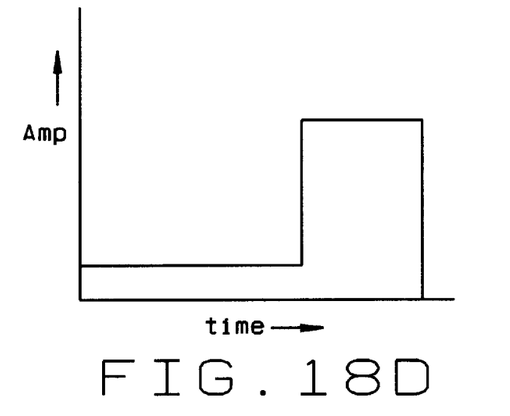
Figure 18E:
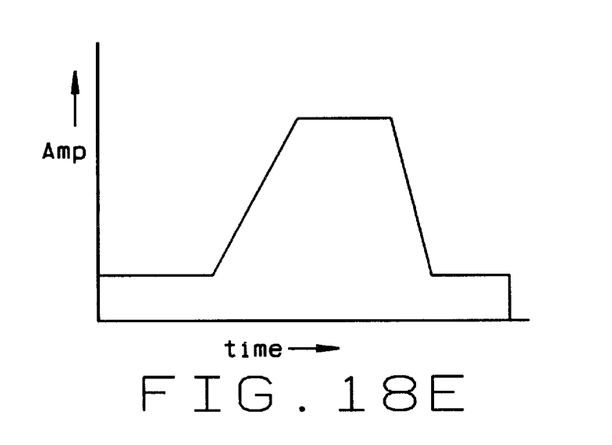
Figure 18F:
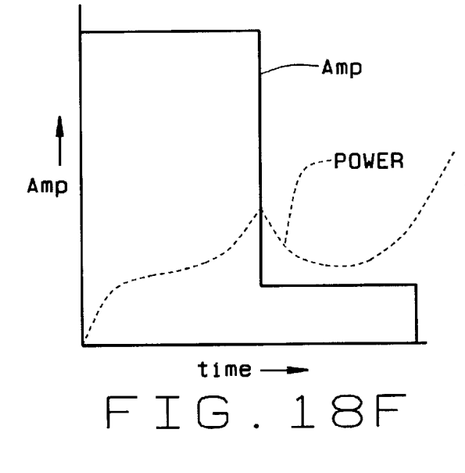
Figure 18G:
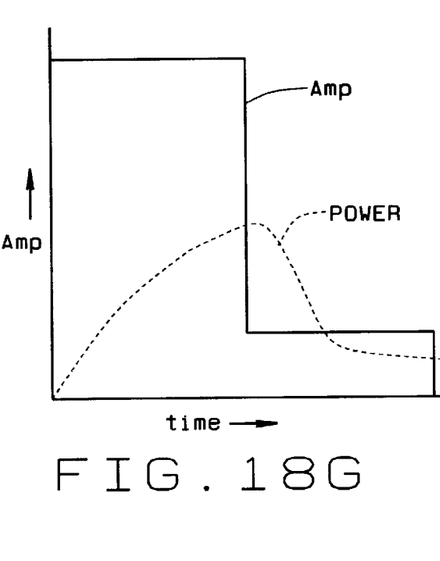
Figure 18H:
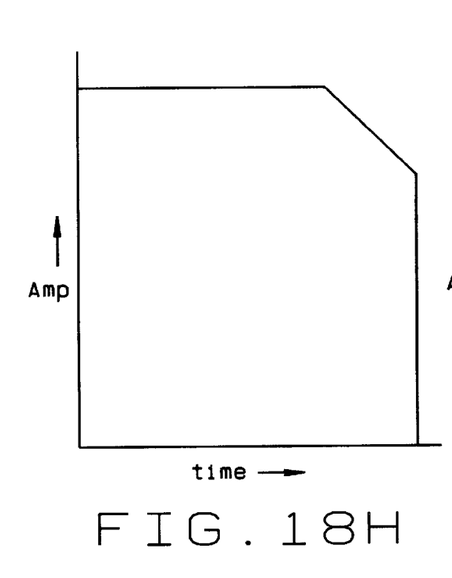
Figure 18I:
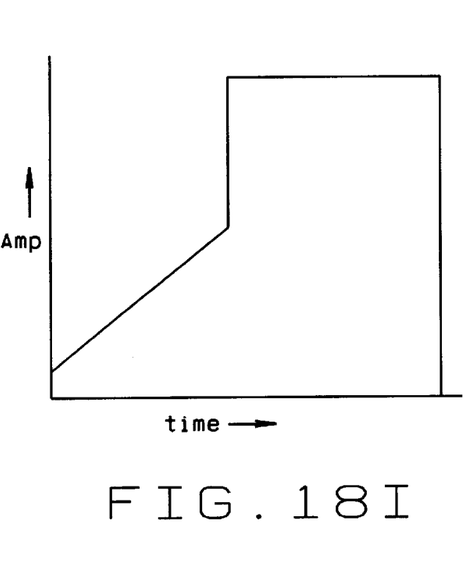

Referring now to FIGS. 18A–18I, various motional amplitude profiles for a variety of weld cycles carried out in accordance with the method of this invention are shown. In FIG. 18A, it is seen the motional amplitude of the ultrasonic horn starts at a relatively high level of motional amplitude. After some initial portion of the weld cycle, the motional amplitude is abruptly reduced and a lower level of motional amplitude is sustained for the remainder of the weld cycle. It has been found that such a motional weld profile generally tends to increase weld strength, to increase solvent resistance, to increase the randomness of the polymer molecules in the weld joint which in turn increases weld strength, increases the consistency of the weld strengths, decreases residual stresses, welding flash and part marking. These weld factors will be described in detail hereinafter.

In FIG. 18B, another weld cycle amplitude profile is shown in which the amplitude of the horn is at a relatively low amplitude during a first portion of the weld cycle and it is held relatively constant during this first portion. Then, during a second or transition portion of the weld cycle, the amplitude is gradually increased from the lower first amplitude level to a higher level and this higher motional amplitude level is maintained for the remainder (a third portion) of the weld cycle. Alternately, as shown in FIG. 18C, the weld cycle can be started at a relatively low motional amplitude level and gradually increased or "ramped up" to a second or higher motional amplitude level which is maintained for the remainder of the weld cycle. It has been found that motional amplitude profiles, such as are illustrated in FIGS. 18B or 18C, decrease the formation of weld particles and decrease weld flash.

Referring to FIG. 18D, the weld cycle begins with a relatively low level of motional amplitude which is maintained for the majority of the weld cycle. Then, after this initial period at this low motional amplitude level, the amplitude is sharply increased as a step function and this higher motional amplitude level is maintained for the remainder of the weld cycle. It has been found that this weld cycle profile generally yields a reduction in dead spots within the weld and is most effective in welding crystalline resins and/or other soft resins.

The profile shown in FIG. 18E has three different motional amplitude levels. In a first portion of the weld cycle, the motional amplitude is at a relatively low level which is maintained throughout this first portion of the weld cycle. Then, the motional amplitude is ramped upwardly to a higher level which is maintained for the remainder of a second portion of the weld cycle. Lastly, the motional amplitude of the horn is gradually reduced (i.e., ramped down) to approximately the first-mentioned lower amplitude level and this is maintained for the remainder of the third portion of the weld cycle. It has been found that the first portion of the weld cycle having the lower motional amplitude level decreases the formation of weld particles, of weld flash and of dead spots during the weld cycle. The higher power level of the second portion of the weld cycle promotes fusion of the workpieces and shortens the length of the weld cycle. The last portion of the weld cycle at the lower motional amplitude level tends to increase the strength of the resulting weld, increases the solvent resistance of the weld, and decreases the residual stresses in the weld and the weld flash or part marking.

In FIGS. 18F and 18G, motional amplitude weld cycle profiles are shown in which the amplitude of the horn initially starts off at a relatively high level for a first portion of the weld cycle and then is stepped down to a lower amplitude level for the remainder of the weld cycle. The power transmitted to the workpieces by the horn is shown in dotted lines. As heretofore noted, power is dependent upon the frequency of the ultrasonic transducer, the engagement force between the horn and the workpiece, and the motional amplitude of the horn engaging the workpieces. It is seen that as the motional amplitude of the horn is dropped at the end of the first portion of the weld cycle shown in FIGS. 18F and 18G, there is a simultaneous drop in the power applied to the workpieces, similar to that illustrated and described above in regard to FIGS. 2 and 4. This lowering of the amplitude (and thus the power) may be controlled either in response to a predetermined time or in response to a parameter of the weld operation, such as collapse of the workpieces (or the energy director) or in response to the sensing of actual or incipient contact of the horn on the anvil, as above described. This reduction in power (motional amplitude) tends to be particularly useful in welding or cutting thermoplastic films or fabrics, improves the consistency of such welding or cutting operations, and reduces horn wear.

The motional amplitude profile illustrated in FIG. 18H shows that the amplitude has a high initial amplitude and, near the end of the weld cycle, is gradually decreased and then abruptly terminated. This style of motional profile has been found to increase the consistency of welds and to shorten the time to complete the welds.

TEST RESULTS

Tests were conducted to determine the effect of motional amplitude control on the strength of welds using an ultrasonic welding apparatus. The tests utilized an ultrasonic welder commercially available from Branson Ultrasonics Corporation of Danbury, Conn. (Model 920MA, WPC 2, WPC-1 using a "smart actuator"). The test specimens were proposed standard samples or specimens as defined by the American Welding Society (AWS), as shown in FIG. 12, of two different thermoplastic resins: ABS (acrylonitrile-butadiene-styrene) and PC (polycarbonate). The joint to be welded used an energy director (as shown in FIG. 12), such as is described in the co-assigned U.S. Pat. No. 4,618,516.

The ultrasonic horn used was a standard 2"×¾" blade horn. The test procedure was to weld a number of the specimens at different welding parameters and maximum achievable strength without varying the amplitude during the weld cycle, a three variable, five level experimental design was completed and the results were used to generate a polynomial expression of weld strength in term of the parameters evaluated. The parameters that were examined were as follows:

| | |
|---|---|
| Weld Time | 100 to 500 mS |
| Weld Force | 82 to 294 lb. |
| Trigger Force (for initiating weld cycle) | 10 to 80 lb. |

The booster horn on the welding machine had a gain of 1:2.0 and the hold time was set over 1.0 seconds to insure solidification of the weld. After the specimens had been welded, they were subjected to standard tensile testing to determine the strength of the weld in resisting tension loading.

ABS Test Specimens

The results showed that the best welds could be obtained with the following parameters:

| Time (mS) | Energy (J) | Press. (psig) | Pk Pwr. (%) | Collapse (in.) | Booster (Gain) | Dnw. Spd. (in./S) | Strength (lb.) | SD (±lbs) |
|---|---|---|---|---|---|---|---|---|
| 275 | 260 | 51 | 61.5 | 0.0683 | 2.0 | 1.4 | 658 | 82 |

100% amplitude during the entire weld cycle.

A second experimental design was constructed in which the amplitude was varied from 70% to 100% during the last portion of the weld cycle. The variables that were varied were:

| | |
|---|---|
| Final weld amplitude | 70 to 100% |
| Time amplitude was changed | 100 to 210 mS |

In these experiments the amplitude was 100% at the start of the weld. Once the trigger time (time to change amplitude) was reached, the amplitude would be sloped to the final amplitude over the remaining weld time.

The results from the experiments indicated that the following parameters were the best:

| Time (mS) | Energy (J) | Press. (psig) | Pk Pwr. (%) | Collapse (in.) | Booster (Gain) | Dnw. Spd. (in./S) | Strength (lb.) | SD (±lbs) |
|---|---|---|---|---|---|---|---|---|
| 280 | 268 | 51 | 61.8 | 0.0677 | 2.0 | 1.4 | 712 | 22 |

The amplitude was ramped from 100% to 90% at 180 mS into the weld cycle.

These test results using ABS test specimens and with substantially identical weld parameters, except that in the second test the amplitude was decreased from 100% to 90% at approximately 180 mS (i.e., about 65% of the preset weld time), showed that the weld strength could be improved slightly from 658 lb. to 721 lb. (about a 9.5% increase). However, the consistency of the weld was greatly improved as the standard deviation decreased from ±82 lb. to ±22 lb., a four-fold decrease.

The second set of experiments evaluated dropping the amplitude in step wise fashion instead of ramping the amplitude down slowly. It was found that by triggering to the lower amplitude responsive to a preset power level, the same results could be obtained. The average strength was 730 lb. with a standard deviation (SD) of ±30 lb.

The last experiments conducted with this ABS material included dropping the amplitude early into the weld cycle, 200 to 400 mS from the start of the weld cycle, below 50% in a stepwise fashion. In these experiments, the best conditions and results are shown below:

| Time (mS) | Energy (J) | Press. (psig) | Pk Pwr. (%) | Collapse (in.) | Booster (Gain) | Dnw. Spd. (in./S) | Strength (lb.) | SD (±lbs) |
|---|---|---|---|---|---|---|---|---|
| 1700 | 441 | 25 | 32.4 | 0.1078 | 1.5 | 0.75 | 1014 | 100 |

The amplitude was dropped from 100% to 30% at 250 mS into the weld cycle.

In the above testing, the same weld samples were used, but the horn amplitude was decreased from 100% to 25% after 15% into the preset weld cycle time interval. It will be noted that the average weld strength increase to 1,014 lb. with a standard deviation of ±100 lb. It is important to note that the time interval was lengthened from 275 and 280 mS to 1700 mS. It should be noted, however, that a weld cycle of about 275–280 mS is not sufficiently long to obtain a sufficient melt of the thermoplastic (ABS) resin material. Further, it will be noted that a weld cycle time of 1700 mS at 100% horn amplitude would be too long and it would result in highly unwanted burning of the plastic material.

Figure 13:
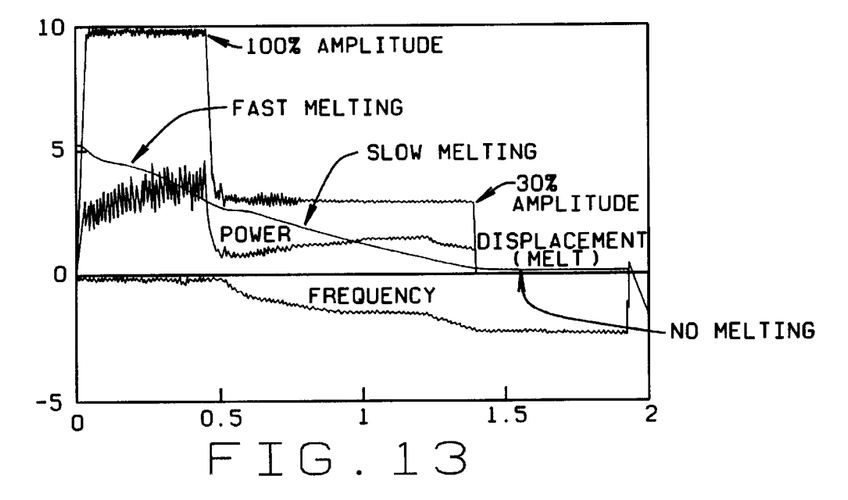
FIG. 13 is a graphical representation of motional amplitude, displacement, power, and frequency of an ultrasonic welder in carrying out the welding method of the present invention, as described in certain of the examples set forth hereinafter.

The curves depicting amplitude, power displacement and frequency as a function of time over the weld cycle (about 2 seconds) are shown in FIG. 13. These results show a significant increase in strength, from 658 lb. to 1014 lb. for the test parameters indicated.

Additional welds were made with similar parameters without varying the amplitude. The results for these tests are listed below:

| Time (mS) | Energy (J) | Press. (psig) | Pk Pwr. (%) | Collapse (in.) | Booster (Gain) | Dnw. Spd. (in./S) | Strength (lb.) | SD (±lbs) |
|---|---|---|---|---|---|---|---|---|
| 1000 | 495 | 25 | 36.5 | 0.1126 | 1.0 | 1.4 | 636 | N/A |
| 650 | 480 | 25 | 56.5 | 0.0876 | 1.0 | 1.4 | 685 | N/A |
| 800 | 559 | | | 0.104 | 1.5 | | 548 | 147 |

The amplitude was maintained at 100% during the entire weld cycle.

Polycarbonate (PC) Test Specimens

Tests similar to the above described tests using ABS thermoplastic test specimens were also run using polycarbonate test specimens. Without amplitude control:

| Time (mS) | Energy (J) | Press. (psig) | Pk Pwr. (%) | Collapse (in.) | Booster (Gain) | Dnw. Spd. (in./S) | Strength (lb.) | SD (±lbs) |
|---|---|---|---|---|---|---|---|---|
| 660 | 394 | 25 | 41.5 | 0.0666 | 1.5 | 0.72 | 599 | N/A |

100% amplitude was maintained throughout the weld cycle. With amplitude control

| Time (mS) | Energy (J) | Press. (psig) | Pk Pwr. (%) | Collapse (in.) | Booster (Gain) | Dnw. Spd. (in./S) | Strength (lb.) | SD (±lbs) |
|---|---|---|---|---|---|---|---|---|
| 1400 | 314 | 25 | 33.7 | 0.0706 | 1.5 | 0.72 | 1734 | 22 |

The amplitude was dropped from 100% to 25% at 400 mS into the weld cycle.

As shown from the above tests, the weld strength was increased from 599 lb. to 1734 lb. when the amplitude of the horn was reduced from 100% to 25% after 400 mS into a 1400 mS weld cycle. It should be noted that the weld cycle time was increased from 660 to 1400 mS. Again, it is pointed out that a weld cycle time of 1400 mS at 100% amplitude would result in burning of the polycarbonate material and that too little power over a shorter weld cycle would not result in sufficient melting of the thermoplastic PC material so as to result in a satisfactory weld.

Figure 14:
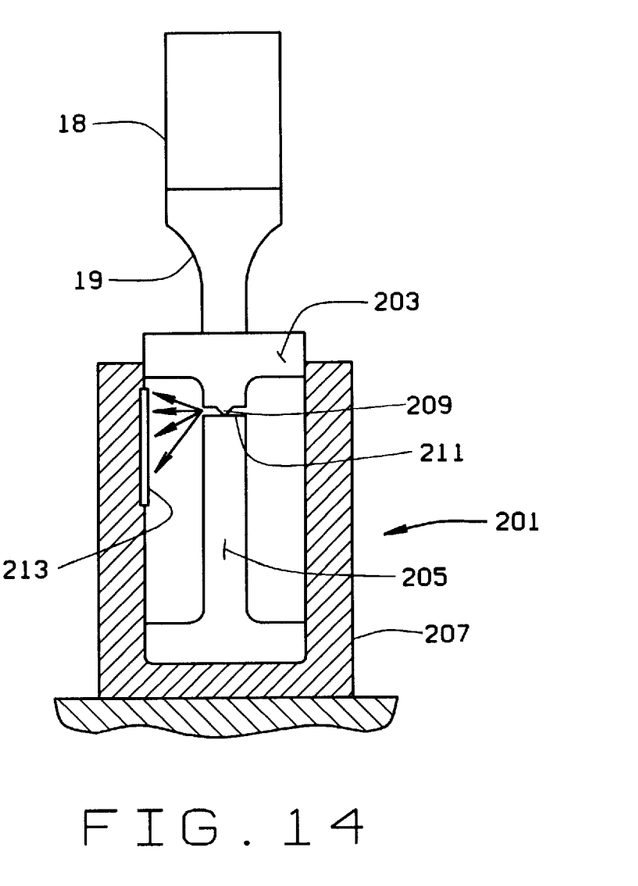
FIG. 14 is an illustration of a test fixture holding a lower part and an upper part of a standard test specimen, the later having an energy director molded thereon.

Referring to FIG. 14, another test setup, as indicated in its entirety at 201, is illustrated in which two thermoplastic parts, referred to as a top part 203 and a bottom part 205, are to be welded in accordance with the above described motional amplitude profiling method. Specifically, the upper and lower parts 203 and 205 are shown to be located in a fixture 207 which holds the parts in a desired position relative to one another for forming a weld joint between the parts. As described, parts 203 and 205 are molded of a suitable polycarbonate resin. The top part has an energy director 209 (similar to energy director described above and shown in FIG. 12) extending downwardly from the lower central portion thereof The energy director 209 is shown to be in contact with an upper surface 211 of the lower part 205 to which the upper part is to be welded. The upper and lower parts 203 and 205, respectively, are held in accurate relation to one another by fixture 207 in such manner that as the energy director 209 melts or otherwise collapses, the upper part may move downwardly within the fixture toward the lower part while maintaining the surfaces of the upper and lower parts to be joined to remain substantially parallel to one another. As further shown in FIG. 14, plastic tape 213, such as vinyl electrician's tape, was adhered to the inner wall of fixture 207 proximate the location of the weld joint to be formed between the upper and lower parts. Tape 213 is attached to the fixture in such manner that its adhesive side faces toward the joint to be formed between the upper and lower parts. In this manner, the number of weld particles expelled from the weld during the weld cycle and adhered to the tape can be determined.

Using the above test setup (i.e., upper part 203, lower part 205, fixture 207 and tape 213), an ultrasonic welding horn 19 powered by an electroacoustic transducer 18 is brought into contact with the upper part such that ultrasonic energy may be transmitted from the horn to the upper part and to the weld joint to be formed. A series of tests were conducted to compare the formation of weld joints and to compare the formation of particulate matter during the formation of the weld joints when the weld joints were formed with and without motional amplitude profiling in accordance with the method of the present invention. More specifically, the formation of particles generated during the formation of a weld joint formed without following the motional profiling was compared to the number of particles generated during the formation of a weld joint following the motional amplitude profiling method of the present invention. A determination of the number of particles formed was determined by forming the joint and then by determining the number of particles captured on a unit area of tape 213 adhered to the sidewalls of fixture 207. Specifically, in forming the weld joint without following the motional amplitude method of the present invention, power was applied to the ultrasonic horn in such manner that the power was increased from zero to 77.6 $\mu m_{pp}$ in 10 mS. The number of particles captured within a unit area on tape 213 was determined (i.e., counted). Then, other parts 203 and 205 identical to the other parts were placed in fixture 207 and new tape 213 was placed in the fixture. Another weld joint was formed in accordance with the motional amplitude profiling method of the present invention in which the power applied to the parts by the ultrasonic horn was gradually increased from about 7.6 $\mu m_{pp}$ to about 31 $\mu m_{pp}$ in about 250 mS. The number of particles captured on the unit area of tape 213 was approximately 81% fewer than was captured when the weld joint was formed as above described without following the motional amplitude profiling method of the present invention.

Other tests were conducted in which welds were made with parts 203, 205 in which the motional amplitude was held relatively constant at amplitudes ranging between about 27 and 31 $\mu m_{pp}$. At 31 $\mu m_{pp}$ the number of particles was about 50% of the number of particles generated at a constant motional amplitude of 77.6 $\mu m_{pp}$. However, in all cases at the lower motional amplitude levels, the number of particles generated during welding was appreciably lower when the weld was formed with motional amplitude profiling.

It will be appreciated by those skilled in the art that the actual time over which the motional amplitude is profiled and the power levels of the motional amplitude may vary drastically from the examples described above (e.g., there may be over an order of magnitude or more in variation) depending on the materials from which the parts to be welded are fabricated, the thickness of the parts, the width and length of the weld, and many other parameters. The optimum amplitude profile for any combination of workpieces will be established by a number of different tries using different motional amplitudes, different ramping rates, and different maximum weld cycle times, depending on the above-noted factors.

Figure 15:
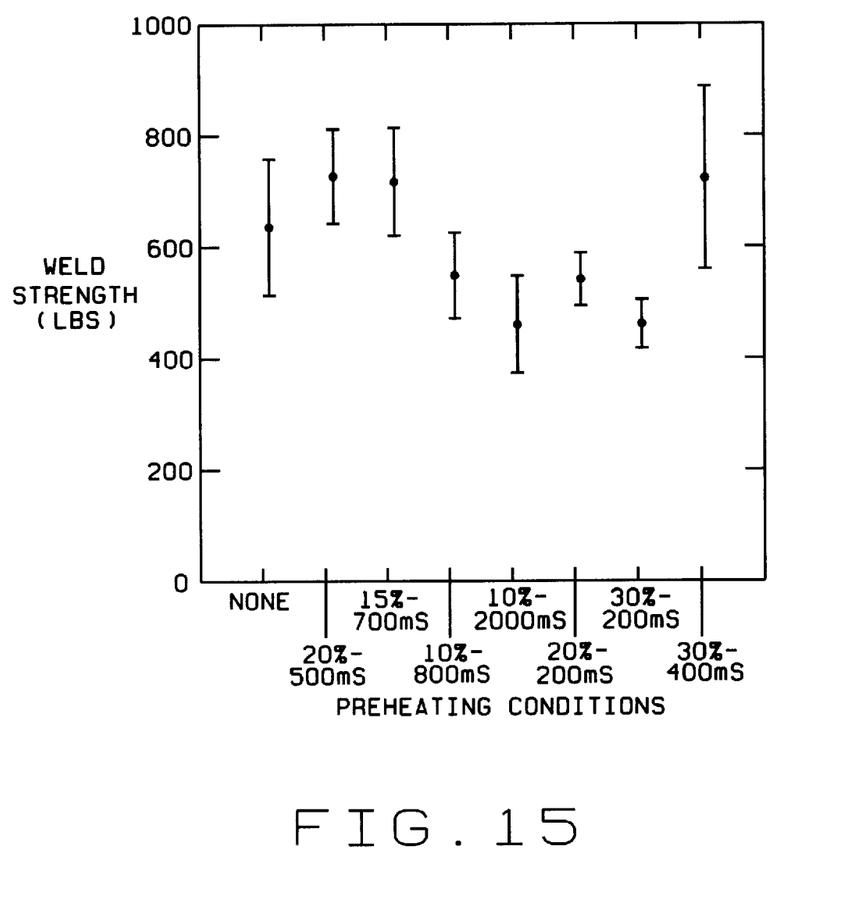
FIG. 15 is a graph depicting the relationship between preheating of the energy director on one of the test parts shown in FIG. 14 under varying preheating conditions.

As shown in FIG. 15, a plot of weld strength as a function of preheating conditions is shown. It is seen that if no preheating (that is, no motional amplitude profiling) is used, as for the leftmost data set depicted in FIG. 15, with a 58 $\mu m_{pp}$ amplitude for an 800 mS weld cycle, the average weld strength is about 638 pounds ($\sigma_1 = \pm 123$ lb.) for nylon parts. However, if limited preheating (or motional amplitude profiling) is used, that is, a 20 $\mu m_{pp}$ motional amplitude for a 500 mS preheat before a 800 mS weld (as depicted by the second data set shown in FIG. 15), the weld strength is 731 pounds ($\sigma_1 = \pm 85$ lb.). On the other hand, if too much preheating is used, such as is shown in the fourth data set illustrated in FIG. 15, the energy director begins to melt and dead spots are promoted. The last data set shown in FIG. 15 illustrates a weld made with the amplitude so high that it appeared as if the weld time was extended to a total time of 1200 mS (that is, 400 mS preheat+800 mS weld time). In this last-mentioned data set, if uniform heating did occur, high weld strength would occur, while very weak welds were generated if dead spots did occur.

In FIG. 15, it will be understood that the data set at the "20%–500 mS" preheating condition means that the amplitude was ramped from 20% amplitude (i.e., 11.6 $\mu m_{pp}$) to 100% amplitude (58 $\mu m_{pp}$) after 500 mS from triggering of the weld cycle. Likewise, the data set at the "30%–700 mS" preheating condition means that the amplitude was ramped from 30% amplitude (i.e., 17.4 $\mu m_{pp}$) after 500 mS from triggering the weld cycle. For all the data sets, all welds were completed with 100% motional amplitude for 800 mS after preheating.

In addition, tests were conducted on welds formed with motional amplitude profiling (as shown in FIG. 18A) and without motional amplitude profiling to determine the resistance of the welds to various solvents. More specifically, welds were made with and without motional amplitude profiling as, described above, and the welds were exposed to gasoline for 10 seconds and then allowed to sit for 30 minutes after the exposure. Then the welds were tested for tensile strength. It was found that the welds made with a profiled amplitude were less affected by the solvent than the non-profiled welds. For example, the weld strength of such a weld formed without profiling (i.e., a constant amplitude of about 97 $\mu m_{pp}$ and a weld cycle time of 700 mS) resulted in a weld strength of about 261 lb. In contrast, when a weld was formed using the motional amplitude profiling method of the present invention (as shown in FIG. 18A) on similar parts and was likewise subjected to gasoline solvent for 10 seconds and tensile tested 30 minutes after exposure to the solvent, the weld strength was determined to be about 476 lb. The motional amplitude profile used to fabricate the above test specimens was varied in step fashion between about 97 $\mu m_{pp}$ and 15 $\mu m_{pp}$ with a weld cycle time of 1500 mS.

Still other tests were conducted using isopropyl alcohol, a less aggressive solvent than gasoline. Welds made with motional amplitude profiling as shown in FIG. 18A and without amplitude profiling were exposed to isopropyl alcohol for 15 seconds and examined 24 hours after exposure to the solvent. It was found that porosity was generated at the tow/edge of the weld made without amplitude profiling, but the weld made with such profiling did not show such visible effects. Upon tensile testing the weld joints, the strength of the weld with profiling did show surprising results. With no solvent exposure, the strength of a weld joint made with amplitude profiling of the present invention exhibited a weld strength of about 1192 lb. ±261 lb., while the joint made without profiling exhibited a weld strength of about 777 lb. ±416 lb. With exposure to isopropyl alcohol, the weld strength of the amplitude profiled weld was determined to be 1381 lb. ±162 lb., while the strength of the weld without amplitude profiling was 991 lb. ±321 lb. Thus, it is seen that after either sets of welds were exposed to isopropyl alcohol, the average weld strength increased by 15% to 30%. It is believed that the reason for this apparent increase in weld strength when the welds are exposed to isopropyl alcohol is due to the fact that the alcohol solvent plasticized the weld joint and promoted bridging of the bond line without significant crazing. The welds formed with amplitude profiling were not affected by the plasticizing action of the solvent to the degree that the non-profiled welds were because the profiled welds already had a good deal of bond line bridging as a result of the amplitude profiling weld process. In addition, it is believed that even more benefits from amplitude profiling will be more apparent upon prolonged exposure of the weld joint to such solvents.

Figure 16:
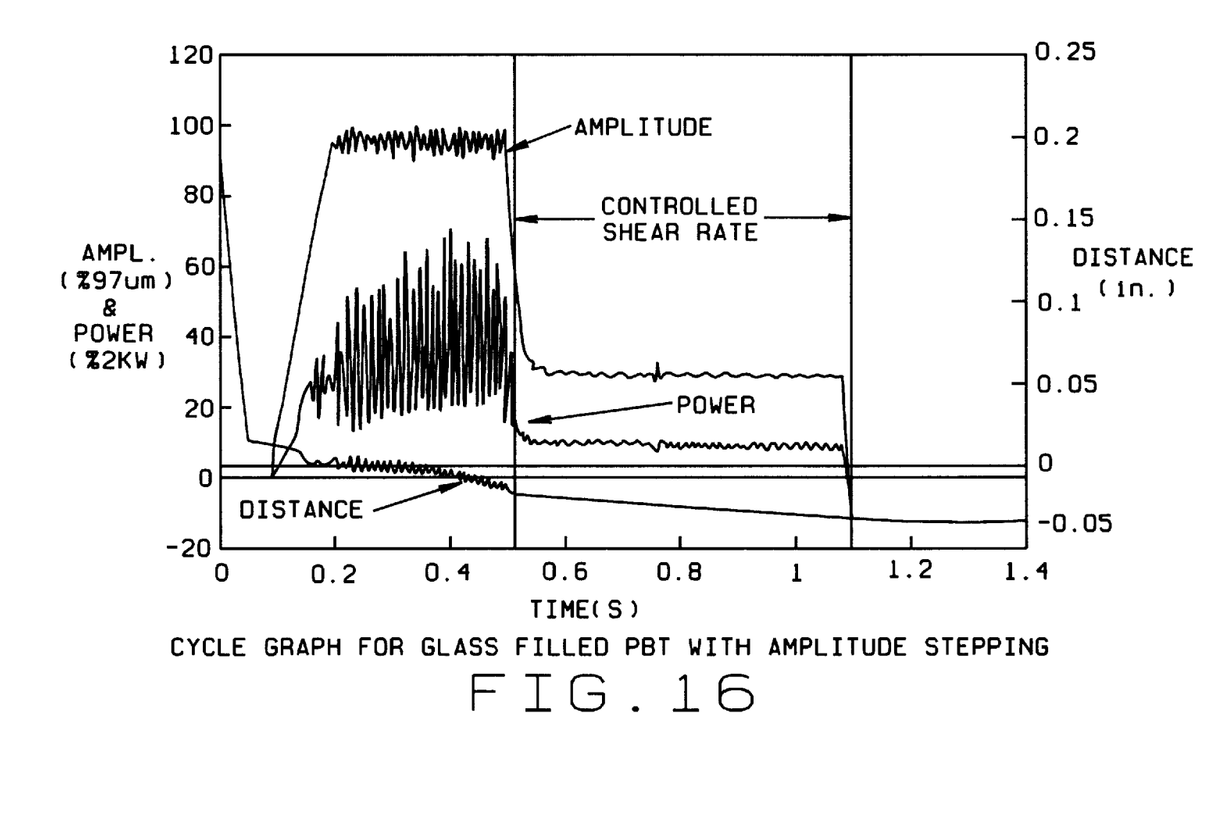
FIG. 16 is a plot of ultrasonic weld motional amplitude and power vs. time for glass filled PBT specimens for test specimen welding with amplitude profiling in accordance with this invention.

Further, in attempting to ultrasonically weld crystalline polymers (e.g., nylon 66 or the like), it has been found that reducing the motional amplitude during the weld cycle does not reduce the viscosity of such polymers sufficiently to allow full control of the melt. Thus, welds made with reduced shear rates and thick bond lines could not be achieved with such crystalline materials. However, in accordance with the present invention, it has been found that the addition of glass fibers to such crystalline materials (PBT) aids in controlling the squeeze flow. Welds made with PBT 33% short glass fibers exhibited collapse curves similar to those seen with amorphous materials, as shown in FIG. 16. There, it is shown that collapse rate is directly proportional to amplitude, and thus shear rate control (which influences weld strength) is possible.

Figure 17:
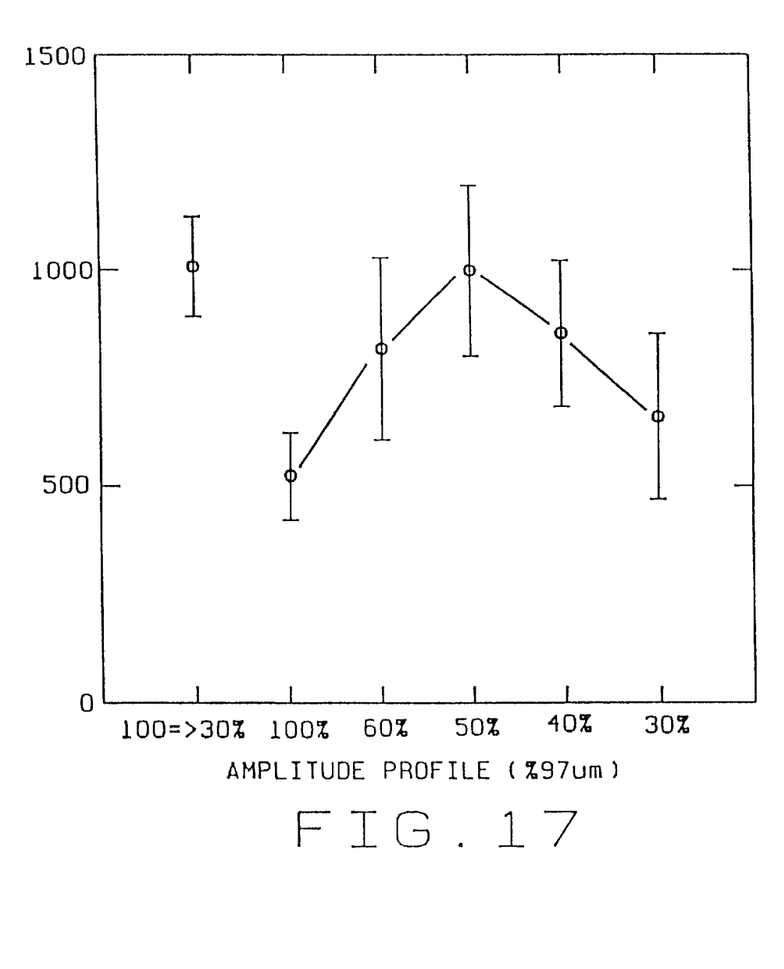
FIG. 17 is a plot of weld strength vs. amplitude profile for various weld test specimens.

Further testes were run to compare welding results with and without amplitude stepping to a given amount of collapse (0.040 in.) of the workpieces. FIG. 17 illustrates the results of this testing wherein a comparison is shown of weld strength of PBT welded workpieces with and without amplitude profiling of the present invention. As shown in FIG. 17, the leftmost dataset (100%=>30%) point represents weld strengths achieved with amplitude stepping or profiling. The remaining five data sets represent weld strength without amplitude stepping. It is seen that if 50% amplitude is used during the entire weld cycle, a maximum weld strength of 1004 lb. (±197 lb.) is possible. However, deviating from this amplitude results in a loss of strength, probably due to overheating or incomplete welding. It is further noted that amplitude stepping did not significantly increase the weld strength as seen with amorphous materials, but the weld strength is probably limited by the lack of fibers bridging the bond line, even though the shear rates are reduced. However, these shear rates are still sufficient to promote fiber orientation. It will be appreciated that a prime advantage of the motional amplitude profiling method of the present invention is to decrease the variance or deviation in weld strength.

Still further, two weld specimens, one welded with amplitude profiling and the other welded without amplitude profiling, were examined and tested to determine the effect of amplitude profiling on molecular orientation of the polymer chains in the weld. The weld specimens were of polycarbonate resin and are shown below:

| Welds | Time | Weld Force (lb.) | Material | Collapse (in.) | Amplitude | Energy Director Height (in.) | Strength (lb.) |
|---|---|---|---|---|---|---|---|
| 5680/5693 | 780 mS | 75 | Polycarbonate | 0.0185 | 77.6 to 15.5 $\mu m_{pp}$ @ 100 mS (Step) | 0.012 | 742 ± 185 |
| 5698/5710 | 318 mS | 75 | Polycarbonate | 0.0190 | 77.6 $\mu m_{pp}$ | 0.012 | 508 ± 146 |

It was determined that with the weld specimens where the welds were formed using amplitude profiling in accordance with the method of this invention, the molecular chains were substantially randomly oriented thus yielding good weld strength. However, with the specimens welded without amplitude profiling, the molecular chains were slightly more oriented in the direction of the weld such that when the weld was loaded in tension, the stress is carried by secondary bonds which are relatively weak. It should be noted that the measured difference in molecular alignment between the two weld specimens was slight, but yet the improved molecular alignment of the weld made using amplitude profiling of the present invention yielded improved weld strength, as shown above. Those skilled in the art will appreciate that in order to improve the molecular alignment of the weld, it is preferable that the motional amplitude of the horn be decreased during the terminal portion of the weld cycle (as shown in FIGS. 18E and 18H).

While there have been described and illustrated certain preferred embodiments of the invention, it will be apparent to those skilled in the art that various further changes and modifications may be without departing from the principle and spirit of this invention, which shall be limited only by the scope of the appended claims.

What is claimed is:

1. An ultrasonic apparatus including a power supply for providing electrical energy in the ultrasonic frequency range to an electroacoustic transducer provided with a horn whose frontal surface is adapted to be coupled to a workpiece for transmitting, when in forced contact with the workpiece and rendered resonant, power in the form of mechanical vibrations in ultrasonic frequency range to the workpiece, the improvement comprising: a sensor for sensing the power transmitted to the workpiece and providing to the power supply a control signal responsive to the power transmitted for changing the power transmitted to the workpiece.

2. An ultrasonic apparatus as set forth in claim 1, said control signal causing a change of the motional amplitude manifest at the frontal surface of the horn.

3. An ultrasonic apparatus as set forth in claim 2, said control signal being responsive to the power transmitted to the workpiece attaining a predetermined value and causing the motional amplitude to be changed to a lower value.

4. An ultrasonic apparatus including a power supply for providing electrical energy in the ultrasonic frequency range to an electroacoustic transducer provided with a horn whose frontal surface is adapted to be coupled to a workpiece for transmitting, when in forced contact with the workpiece and rendered resonant, power in the form of mechanical vibrations in the ultrasonic frequency range to the workpiece, the improvement comprising: means disposed for sensing a changing dimension of the workpiece and providing in response thereto a control signal to the power supply for changing the power transmitted to the workpiece.

5. An ultrasonic apparatus as set forth in claim 4, said control signal causing a change of the motional amplitude manifest at the frontal surface of the horn.

6. An ultrasonic apparatus as set forth in claim 4, said control signal being responsive to a predetermined dimensional change and causing the motional amplitude to be changed to a lower value.

7. An ultrasonic apparatus including a power supply for providing electrical energy in the ultrasonic frequency range to an electroacoustic transducer provided with a horn whose frontal surface is adapted to be coupled to a workpiece for transmitting, when in forced contact with the workpiece and rendered resonant for a certain time interval, power in the form of mechanical vibrations in the ultrasonic frequency range to the workpiece, the improvement comprising: time responsive means coupled for providing during the time interval a control signal to the power supply for changing the power heretofore transmitted to the workpiece during said interval.

8. An ultrasonic apparatus as set forth in claim 7, said control signal causing a change of the motional amplitude manifest at the frontal surface of said horn.

9. An ultrasonic apparatus as set forth in claim 8, said control signal causing the motional amplitude to be changed to a lower value.

10. An ultrasonic apparatus including a power supply for providing electrical energy in the ultrasonic frequency range to an electroacoustic transducer provided with a horn whose frontal surface is adapted to be coupled to a workpiece for transmitting, when in forced contact with the workpiece and rendered resonant, power in the form of mechanical vibrations in the ultrasonic frequency range to the workplace for a time interval.

* * * * *